United States Patent [19]

Sheerin

[11] Patent Number: 5,748,709
[45] Date of Patent: May 5, 1998

[54] PROGRAMMABLE ANSWERING MACHINE WITH MULTIPLE VOICE BOXES AND CALLER ID

[76] Inventor: Howard H. Sheerin, 1625 Larimer St., #1908, Denver, Colo. 80202

[21] Appl. No.: 533,343

[22] Filed: Sep. 25, 1995

[51] Int. Cl.$^6$ .................................................. H04M 1/65
[52] U.S. Cl. ........................... 379/67; 379/88; 379/142; 379/387
[58] Field of Search ................ 379/67, 70, 73, 379/76, 79, 82, 88, 89, 93, 96, 127, 142, 182, 183, 350, 372, 387, 93.09, 93.23, 100.08

[56] References Cited

U.S. PATENT DOCUMENTS

| | | | |
|---|---|---|---|
| 4,847,889 | 7/1989 | Eswaran | 379/67 |
| 4,951,307 | 8/1990 | Willard | 379/74 |
| 4,985,913 | 1/1991 | Shalom et al. | 379/76 |
| 5,400,393 | 3/1995 | Knuth et al. | 379/88 |
| 5,550,900 | 8/1996 | Ensor et al. | 379/67 |
| 5,581,599 | 12/1996 | Tsuji et al. | 379/63 |
| 5,604,791 | 2/1997 | Lee | 379/67 |
| 5,623,537 | 4/1997 | Ensor et al. | 379/67 |
| 5,644,629 | 7/1997 | Chow | 379/142 |
| 5,651,055 | 7/1997 | Argade | 379/88 |
| 5,661,788 | 8/1997 | Chin | 379/142 |

*Primary Examiner*—Krista Zele
*Assistant Examiner*—Scott L. Weaver

[57] ABSTRACT

A method and apparatus for programming a home answering machine having multiple storage devices for individual voice mail boxes and capable of receiving "Caller ID" data. The answering machine is programmed either by the caller or the user so that the "Caller ID" data can be used to automatically route incoming messages to individual voice mail boxes. A caller identification data base stores the "Caller ID" data, and a CPU uses the data base to direct the caller's message to the appropriate voice mail box.

4 Claims, 3 Drawing Sheets

PROGRAMMABLE ANSWERING MACHINE WITH MULTIPLE VOICE BOXES AND CALLER ID

FIELD OF USE

The present invention relates to telephone answering machines, and particularly, to an answering machine that incorporates message mail boxes, caller identification information, and a means for associating the caller identification information with the message mail boxes.

BACKGROUND

The first home answering machines provide only one message storage device (commonly a cassette tape) for storing all of the messages recorded by callers. A "save" button on the answering machine allows the user to selectively save messages currently recorded on the answering machine, but the "save" button is inconvenient because the user must stay near the answering machine and selectively save messages for others. The alternative is to save all of the messages, but this creates a problem of not knowing when the messages can be safely deleted. If the user mistakenly believes that all of the messages are old, then if deleted some of the messages are not heard by the intended listener. To resolve this problem, the user commonly jots down the message on a pad of paper, and the written note serves to pass the message on to the intended person. Unfortunately, less than diligent users often forget to jot down a note and simply delete all of the messages.

Yet another problem with conventional answering machines having one storage device is that the user must either listen to all of the messages or fast forward the answering machine to their messages. Fast forwarding to individual messages is inconvenient, and listening to all of the messages is time consuming, especially when there are several people living in one home.

To overcome the above problems, more recent home telephone answering machines use several storage devices in a multiple voice mail box system. Each individual in the home is assigned to one of the voice mail boxes, and messages intended for those individuals are stored in their respective storage device (mail box). Rather than one "play" button for playing all of the messages, the answering machine provides a "play" button for each individual. In this manner, each individual can erase their messages once heard without deleting messages for others. Further, each individual hears only their messages without having to listen to all of the messages.

Voice mail box home answering machines normally provide a method for associating the caller with the person who is to receive the message. For example, in U.S. Pat. No. 4,951,307 issued to Willard, each individual is associated with one of the touch tone buttons on the telephone. The outgoing answering machine message instructs the caller to select an individual by pressing the associated touch tone button. In this manner, the caller's message is stored in the voice mail box associated with the individual selected by the caller. However, instructing the caller to select an individual using the telephone key pad is inconvenient because it requires the caller to listen to a longer message.

"Caller ID" is a service provided by the local telephone company whereby identification information about the caller is transmitted to a "Caller ID" receiver located at the receiving end of the phone call. Initially, "Caller ID" was intended to inform people as to the identity of a caller, including their name and telephone number, provide a recorded history of callers, and allow an individual to screen unwanted calls. In U.S. Pat. No. 5,400,393 issued to Knuth et al., the "Caller ID" data is also used to associate the caller with an individual's voice mail box in a home answering machine, thereby obviating the need for the caller to select the individual using the touch tone buttons.

A problem with using "Caller ID" data to route messages to voice mail boxes is that the answering machine must be pre-programmed with the "Caller ID" data. That is, the answering machine requires a priori knowledge about the caller before the "Caller ID" data can be used to correctly route the message.

What is needed is a convenient method for programming a home answering machine having multiple storage devices for individual voice mail boxes and capable of receiving "Caller ID" data so that the answering machine can automatically route incoming messages to the correct voice mail box.

SUMMARY OF THE INVENTION

A method and apparatus for programming a home answering machine having multiple storage devices for individual voice mail boxes and capable of receiving "Caller ID" data. The answering machine is programmed either by the caller or the user so that the "Caller ID" data can be used to automatically route incoming messages to individual voice mail boxes. A caller identification data base stores the "Caller ID" data, and a CPU uses the data base to direct the caller's message to the appropriate voice mail box.

One method of programming the answering machine is to have the user enter the requisite data through the telephone keypad. For instance, the user enters the telephone number of a known caller using the telephone keypad, and then presses a PROG key to associate the telephone number with an individual voice box.

In an alternative method for programming the answering machine, one of two outgoing messages is broadcasted to the caller. If the caller identification data has not yet been associated with an individualized storage device, then a first outgoing message directs the caller to select an individual using the touch-tone keypad on the telephone. A second outgoing message recorded by the individual then directs the caller to leave a message. The caller identification data is stored in the identification data base so that when the same caller calls again, the answering machine automatically skips the first message and broadcasts the second message directing the caller to leave a message for the individual associated with the caller identification data. The caller's message is then automatically stored in that individuals storage device.

In most cases it is not a problem for the caller to select the individual and program the answering machine in response to their selection. However, there are a number of potential drawbacks associated with this method that are overcome by the present invention. For instance, the caller may be a doctor who needs to speak with a parent but doesn't know the name of the parent. Another example would be a small business environment where there are several individuals associated with the answering machine and where an outgoing message broadcasting every individual extension would be inconvenient and unprofessional.

To overcome these problems, the present invention provides an autonomous or "home" voice box for storing the caller message if the caller identification data has not yet been associated with an individual. When the user plays a message recorded in the "home" voice box, the user associates the caller identification data with an individual mail box by pressing a PROG key. The message in the "home" voice box is also copied to the individual's voice box. An advantage to this method is that the user does not have to know the telephone number of those who would call nor does the user have to enter the telephone number using the telephone keypad. Further, the caller does not need to know the individual's name to leave a message nor does the caller have to listen to a list of individual extensions.

DETAILED DESCRIPTION OF THE DRAWINGS

Answering Machine Interface

Figure 1:
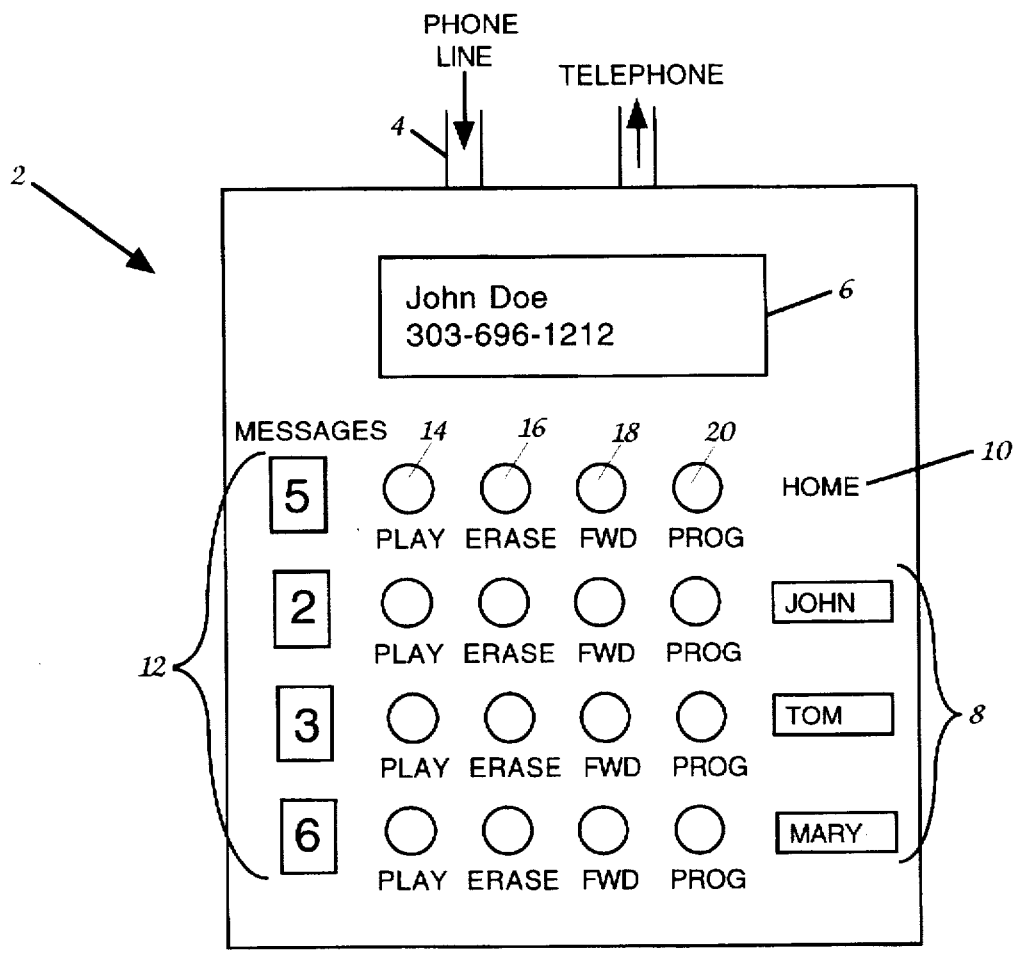
FIG. 1 shows the user interface panel for the telephone answering machine of the present invention.

Referring now to FIG. 1, shown is a user interface panel for operating the telephone answering machine 2 of the present invention. A telephone line 4 passes through the answering machine 2 and connects to the user's telephone. In an alternative embodiment (not shown), the answering machine is an integrated part of the user's telephone. In either case, the answering machine receives caller identification data and caller messages over the telephone line 4 from a caller, and transmits outgoing messages over the telephone line 4 to the caller.

The caller identification data (or more commonly referred to as "Caller ID" data) normally comprises the telephone number and name of the calling party. A liquid crystal display 6 located at the top of the answering machine displays the caller identification data when a call is received. The display notifies the user as to the identity of the caller so that the user can either pick up the call, or let the answering machine take it. The caller identification data is also used to direct the caller's message to the intended receiver's voice box.

Inside the answering machine 2, a plurality of individual 8 voice boxes store the caller messages. Each voice box is assigned to a person living in the house except for an autonomous voice box 10 labeled "home". When a call is received, the answering machine 2 uses the caller identification data to direct the call to the intended individuals voice box 8. Before the answering machine can direct the call, however, it must be pre-programmed with the caller identification data so that it knows which voice box to select. If the caller identification data has not yet been associated with an individual voice box, then the call is directed to the autonomous or "home" voice box 10.

An LED message count display 12 associated with each voice box displays the number of messages currently saved. Several options are provided to the user for playing 14 the messages, erasing 16 the messages, fast forwarding 18 the messages, and programming 20 the answering machine. If the user plays 14 a message in the "home" voice box 10 and concurrently presses the program key 20 associated with one of the other voice boxes, then the message is copied to the selected voice box and the caller identification data is automatically associated with that voice box. In this manner, future calls with the same caller identification data are automatically directed to the associated voice box rather than to the "home" voice box 10. The caller identification data can also be associated with the "home" voice box 10 by pressing its program key 20.

In another method for programming the answering machine with the caller identification data, an outgoing message from the answering machine directs the caller to select one of the individual's voice boxes 8 using the touch tone keypad on the caller's telephone. For example, the outgoing message for the "home" voice box 10 might broadcast:

"Press '1' for John, '2' for Tom, '3' for Mary and '0' if you do not know the name of the person you are trying to reach."

When the caller presses one of the keypad numbers, the caller identification data is automatically associated with the selected voice box.

In some situations, the user may not want the answering machine to direct the caller to select an individual voice box. Small businesses, for example, may want the outgoing message for the "home" voice box 10 to broadcast:

"Thank you for calling Sunday Cleaners. If you know the extension of the person you are calling, please enter it now. Otherwise, please press '0' to leave a message and we will return your call as soon as possible."

If the caller enters the extension associated with the individual voice box, that individual's personalized outgoing message is broadcasted and the caller's message is stored in the individual's voice box 8. If the caller presses '0', then an audible beep signals the caller to begin the message which is stored in the "home" voice box 10. When the caller messages in the "home" voice box 10 are played by the user, the caller identification data can be associated with an individual voice box 8 by pressing its program key 20 as explained above.

Yet another way to program the answering machine with the caller identification data is for the user to enter it using the touch tone keypad on the user's telephone. After the user dials a telephone number, the number becomes the current caller identification data and can be associated with an individual voice box 8 by pressing its program key 20. In this manner, whenever an individual makes a telephone call, the telephone number can be automatically programmed into that individual's caller identification data base by simply pressing the program key 20 after dialing the number.

Answering Machine Circuitry and Operation

Figure 2:
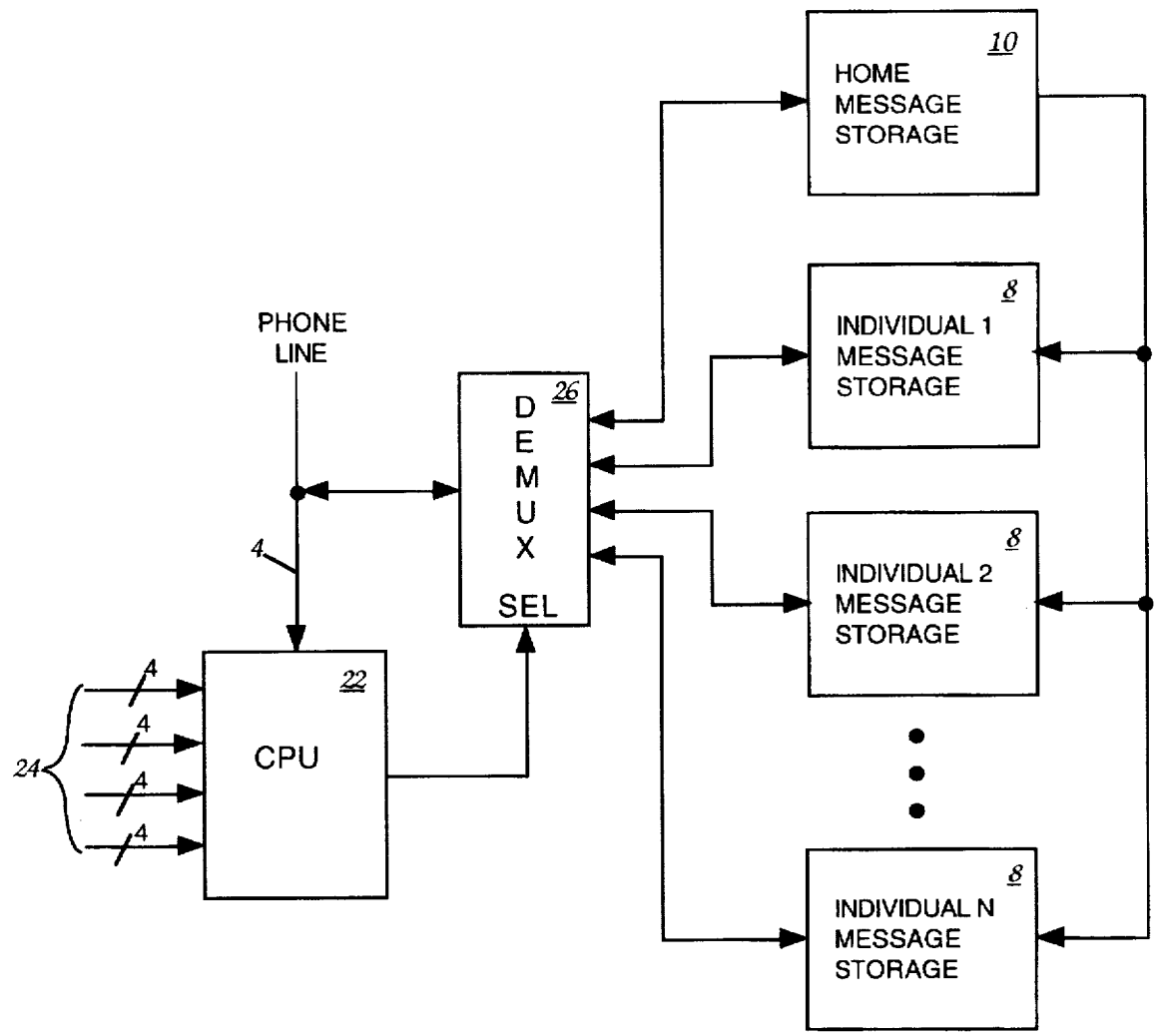
FIG. 2 shows the circuitry for implementing the voice boxes.
Figure 3:
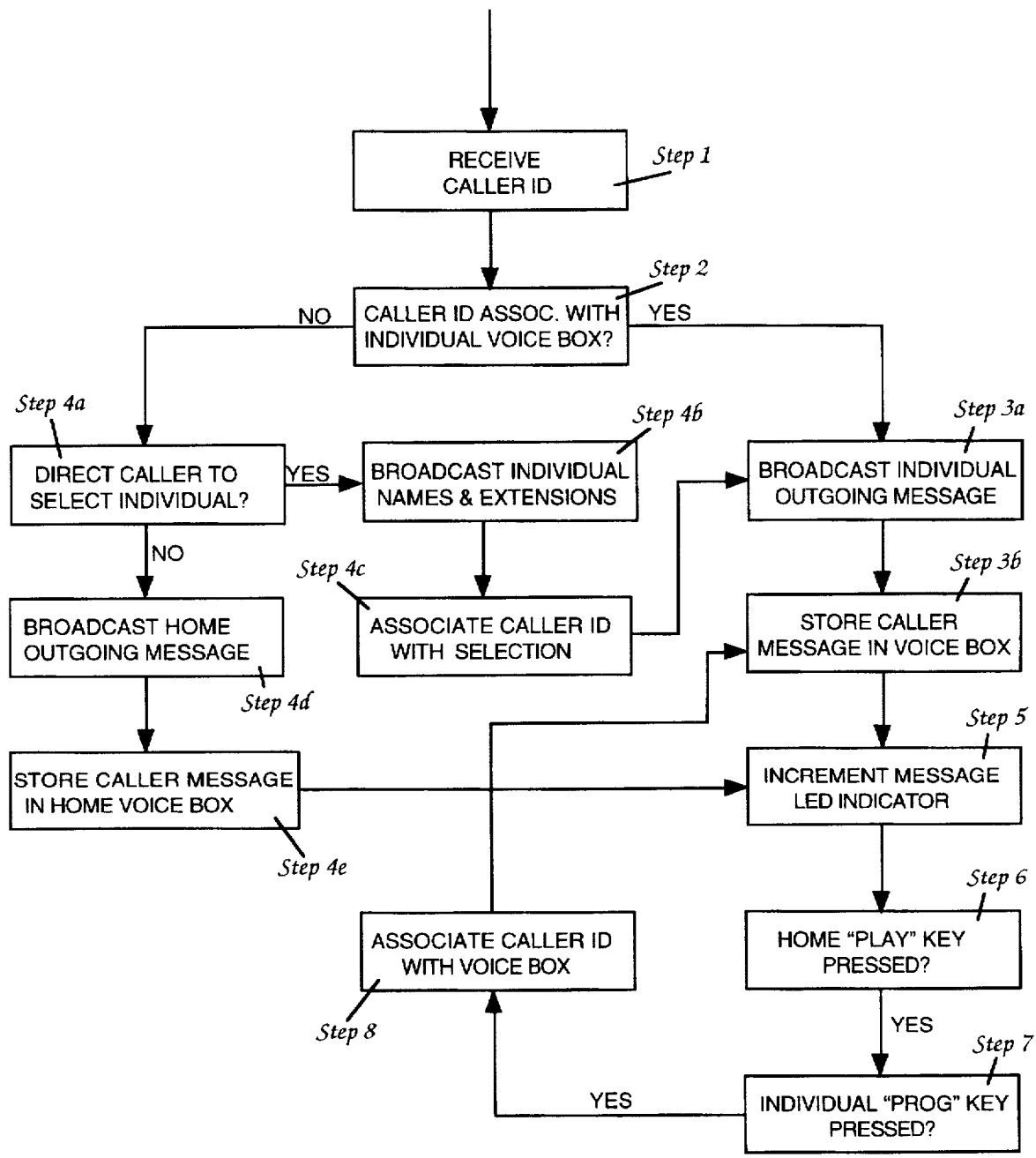
FIG. 3 is a flow chart of the program executed by a microprocessor for receiving caller identification data, associating the caller identification data with an individual voice box, and directing the caller message to the appropriate voice box.

Referring now to FIG. 2 and FIG. 3, shown is a circuit diagram for the answering machine of the present invention and an associated flow chart illustrating its operation. A central processing unit (CPU) 22 receives the caller identification data over the telephone line 4. The user key information play 14, erase 16, forward 18 and program 20 are also input into the CPU 22 over interface lines 24. The CPU 22 executes a control program outlined in FIG. 3 to implement the features of the present invention described above. The control program comprises a data base for storing the caller identification data associated with each voice box. The control program executes the following steps:

Step 1: a call and associated Caller ID is received over the telephone line 4.

Step 2: the CPU 22 compares the incoming Caller ID with the current content of the data base to determine if an individual voice box 8 should receive the call.

Step 3a: if the caller identification data is associated with an individual, then the CPU 22 routes through a demultiplexor 26 an outgoing message associated with that individual's voice box 8 which instructs the caller to leave a message for the individual; and Step 3b: the CPU 22 routes the caller's message back through the demultiplexor 26 to be stored in the individual's voice box 8.

Step 4a: if the caller identification data is not currently associated with an individual voice box 8, then either:

Step 4b: an outgoing message from the "home" voice box 10 instructs the caller to enter the extension of the individual they intend to leave a message for;

Step 4c: the CPU 22 stores the Caller ID in the data base and associates it with the individual voice box 8 that the caller selected; and Step 3a: the CPU 22 routes through a demultiplexor 26 an outgoing message associated with that individual's voice box 8 which instructs the caller to leave a message for the individual;

or

Step 4d: an outgoing message from the "home" voice box instructs the caller to leave a message; and Step 4e: the CPU 22 stores the caller message in the "home" voice box 10 and saves the Caller ID.

Step 5: the LED indicator 12 associated with the voice box that stored the message is incremented indicating that a new message has been received.

Step 6: the CPU 22 waits for the user to press the PLAY key 14 for the "home" voice box 10.

Step 7: if the user presses the PLAY key 14 for the "home" voice box 10, then, while the stored caller message is being broadcasted, the CPU 22 waits for the user to press the PROG key 20 for one of the individual voice boxes 8.

Step 8: if the user presses the PROG key 20 for one of the individual voice boxes 8 while a message from the "home" voice box 10 is being played, then the CPU 22 associates the Caller ID saved in Step 4e with the selected individual voice box 8 and copies the caller's message from the "home" voice box 10 to the individual's voice box 8.

In this manner, when the same caller calls again, the CPU 22 skips the intermediate Steps 4a–4c and automatically connects the caller to the individual's voice box at Step 3a.

Many changes in form and detail could be made without departing from the spirit and scope of the present invention; the particular embodiments disclosed herein are not intended to be limiting. The scope of the invention is properly construed from the following claims.

I claim:

1. A telephone answering machine, comprising:
   (a) an input connected to receive information over a telephone line, the information comprising caller identification data and a caller message;
   (b) a plurality of individualized storage devices, wherein the caller identification data is used to select one of the individualized storage devices to store the caller message;
   (c) an autonomous storage device for storing the caller message if the caller identification data has not been associated with one of the individualized storage devices;
   (d) an identification data base for storing recorded identification data, the data base for comparing the caller identification data to the recorded identification data in order to automatically select one of the individualized storage devices for storing the caller message; and
   (e) an outgoing message for directing a caller to select the individualized storage device to store the caller message, wherein:
      the caller selects the individualized storage device by pressing a corresponding key on a numeric keypad of a telephone the caller is calling from; and
      the caller identification data is automatically stored in the identification data base and associated with the individualized storage device that the caller selected.

2. The telephone answering machine as recited in claim 1, wherein the outgoing message comprises:
   (a) a first message for directing the caller to select one of the individualized storage devices to store the caller message if the caller identification data has not been associated with one of the individualized storage devices; and
   (b) a second message for directing the caller to record the caller message if the caller identification data has been pre-associated with one of the individualized storage devices.

3. A telephone answering machine, comprising:
   (a) an input connected to receive information over a telephone line, the information comprising caller identification data and a caller message;
   (b) a plurality of individualized storage devices, wherein the caller identification data is used to select one of the individualized storage devices to store the caller message;
   (c) an autonomous storage device for storing the caller message if the caller identification data has not been associated with one of the individualized storage devices;
   (d) an identification data base for storing recorded identification data, the data base for comparing the caller identification data to the recorded identification data in order to automatically select one of the individualized storage devices for storing the caller message; and
   (e) a program key manually activated by a user operating the telephone answering machine for associating the caller identification data corresponding to the caller message stored in the autonomous storage device with one of the individualized storage devices.

4. A telephone answering machine, comprising:
   (a) an input connected to receive information over a telephone line, the information comprising caller identification data and a caller message;
   (b) a plurality of individualized storage devices, wherein the caller identification data is used to select one of the individualized storage devices to store the caller message;
   (c) an outgoing message for directing a caller to select the individualized storage device to store the caller message, wherein:
      (i) the caller selects the individualized storage device by pressing a corresponding key on a numeric keypad of a telephone the caller is calling from; and
      (ii) the caller identification data is automatically stored as recorded identification data and associated with the individualized storage device that the caller selected; and
   (d) an identification data base for storing the recorded identification data, the data base for comparing the caller identification data to the recorded identification data in order to automatically select the individualized storage device for storing the caller message.

* * * * *